(12) United States Patent     (10) Patent No.:   US 12,654,952 B2
Kandasamy et al.     (45) Date of Patent:    Jun. 16, 2026

(54) METHODS, APPARATUSES, AND COMPUTER PROGRAM PRODUCTS FOR AUTOMATIC CONFIGURATION OF A MOTOR DRIVEN ROLLER

(71) Applicant: INTELLIGRATED HEADQUARTERS, LLC, Mason, OH (US)

(72) Inventors: Jeyaprakash Kandasamy, Charlotte, NC (US); Anusuya Panchanathan, Charlotte, NC (US); Ajith Krishnan, Charlotte, NC (US)

(73) Assignee: Intelligrated Headquarters, LLC, Mason, OH (US)

( * ) Notice: Subject to any disclaimer, the term of this patent is extended or adjusted under 35 U.S.C. 154(b) by 421 days.

(21) Appl. No.: 18/500,630

(22) Filed: Nov. 2, 2023

(65)       Prior Publication Data

US 2024/0166451 A1     May 23, 2024

(30)      Foreign Application Priority Data

Nov. 21, 2022   (IN)  .............................. 202211066711

(51) Int. Cl.
     *B65G 43/10*      (2006.01)
     *B65G 39/10*      (2006.01)
     (Continued)

(52) U.S. Cl.
     CPC ............. *B65G 43/10* (2013.01); *B65G 39/10* (2013.01); *G06F 18/22* (2023.01); *H02P 29/00* (2013.01)

(58) Field of Classification Search
     CPC ......... B65G 43/10; B65G 39/10; G06F 18/22; H02P 29/00
          (Continued)

(56)        References Cited

U.S. PATENT DOCUMENTS 4,621,662 A  *  11/1986   Olry ........................ D04H 18/02
                                   156/425
2020/0277145 A1*   9/2020   Combs ................... B65G 13/02

FOREIGN PATENT DOCUMENTS

CN       208868779 U     5/2019
JP       2000-242318 A    9/2000

OTHER PUBLICATIONS

Extended European Search Report Mailed on Apr. 5, 2024 for EP Application No. 23203918, 5 page(s).

* cited by examiner

*Primary Examiner* — Ernesto A Suarez
*Assistant Examiner* — Laurence R Brothers
(74) *Attorney, Agent, or Firm* — Alston & Bird LLP

(57)         ABSTRACT

Methods, apparatuses, and computer program products for automatic configuration of a motor driven roller (MDR) are provided. For example, a computer-implemented method may include transmitting a signal to a motor of an MDR to instruct the motor to rotate at a predetermined rotational speed; receiving a signal indicating an actual rotational speed of the motor; receiving a signal indicating an actual rotational speed of a roller being rotated by the motor; dividing the actual rotational speed of the motor by the actual rotational speed of the roller to obtain a ratio of motor speed to roller speed; comparing the ratio to predefined numeric values to determine if the ratio matches any of the predefined numeric values, each of the predefined numeric values being associated with predefined motor configuration data; and transmitting, to the MDR, the predefined motor configuration data corresponding to the predefined numeric value matching the ratio.

20 Claims, 3 Drawing Sheets

(51) Int. Cl.
 *G06F 18/22* (2023.01)
 *H02P 29/00* (2016.01)
 *G05B 19/418* (2006.01)

(58) Field of Classification Search
 USPC ........................................ 198/824–829, 832
 See application file for complete search history.

METHODS, APPARATUSES, AND COMPUTER PROGRAM PRODUCTS FOR AUTOMATIC CONFIGURATION OF A MOTOR DRIVEN ROLLER

CROSS-REFERENCE TO RELATED APPLICATIONS

This application claims priority pursuant to 35 U.S.C. 119(a) to Indian Application No. 202211066711, filed Nov. 21, 2022, which application is incorporated herein by reference in its entirety.

FIELD OF THE INVENTION

Example embodiments of the present disclosure relate generally to conveyor systems with motor driven rollers and, more particularly, to methods, apparatuses, and computer program products for automatic configuration of motor driven rollers.

BACKGROUND

Conveyor systems often use motor driven rollers (MDRs) (also termed motorized rollers) mounted within the conveyor frames. An MDR is a cylindrically-shaped component which drives a conveyor system. Unlike traditional idler rollers driven by an external power source, an MDR is an automated modular unit which gets a direct driving mechanical input from an internal electric motor within a housing of the MDR. The internal motor rotates and, via gearing, in turn rotates at least a portion of the housing.

MDRs are typically available in many different models for different applications. The different models may have, for example, different speed and/or torque ranges. The different models often must be configured differently, which typically involves saving a configuration file to the MDR's control board. It can be difficult to ensure that the correct configuration file is saved to each MDR, especially in a large conveyor installation.

Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and computer program products for automatic configuration of a motor driven roller.

In accordance with various embodiments of the present disclosure, an apparatus is provided. In some embodiments, the apparatus comprises at least one processor and at least one non-transitory memory comprising program code. In some embodiments, the at least one non-transitory memory and the program code are configured to, with the at least one processor, cause the apparatus to at least: transmit a signal to a motor of a motor driven roller (MDR) to instruct the motor to rotate at a predetermined rotational speed; receive a signal indicating an actual rotational speed of the motor; receive a signal indicating an actual rotational speed of a roller of the MDR being rotated by the motor; divide the actual rotational speed of the motor by the actual rotational speed of the roller to obtain a ratio of motor speed to roller speed; compare the ratio to each of a plurality of predefined numeric values to determine if the ratio matches any of the predefined numeric values, each of the predefined numeric values being associated with predefined motor configuration data; and transmit, to the MDR, the predefined motor configuration data corresponding to the one of the predefined numeric values matching the ratio.

In some embodiments, the ratio matches a predefined numeric value if the ratio is within a predefined range of the predefined numeric value.

In some embodiments, receiving a signal indicating an actual rotational speed of the motor, receiving a signal indicating an actual rotational speed of a roller of the MDR being rotated by the motor, and dividing the actual rotational speed of the motor by the actual rotational speed of the roller to obtain a ratio of motor speed to roller speed are performed a plurality of times to obtain a plurality of ratios; the at least one non-transitory memory and the program code are configured to, with the at least one processor, cause the apparatus to calculate an average of the plurality of ratios; and comparing the ratio to each of a plurality of predefined numeric values to determine if the ratio matches any of the predefined numeric values comprises comparing the average of the ratios to each of a plurality of predefined numeric values to determine if the average of the ratios matches any of the predefined numeric values.

In some embodiments, the at least one non-transitory memory and the program code are configured to, with the at least one processor, cause the apparatus to determine if the actual rotational speed of the motor equals or exceeds the predetermined rotational speed; and divide the actual rotational speed of the motor by the actual rotational speed of the roller to obtain a ratio of motor speed to roller speed comprises dividing the actual rotational speed of the motor by the actual rotational speed of the roller to obtain a ratio of motor speed to roller speed if the actual rotational speed of the motor equals or exceeds the predetermined rotational speed In some embodiments, the predetermined rotational speed equals 1000 revolutions per minute.

In some embodiments, after transmitting, to the MDR, the predefined motor configuration data corresponding to the one of the predefined numeric values matching the ratio, the at least one non-transitory memory and the program code are configured to, with the at least one processor, cause the apparatus to: transmit a signal to the motor of the MDR to instruct the motor to rotate at a second predetermined rotational speed corresponding to the transmitted motor configuration data; receive a signal indicating an actual rotational speed of the motor; receive a signal indicating an actual rotational speed of a roller of the MDR being rotated by the motor; divide the actual rotational speed of the motor by the actual rotational speed of the roller to obtain a second ratio of motor speed to roller speed; and compare the second ratio to the predefined numeric value corresponding to the transmitted motor configuration data to determine if the second ratio matches the predefined numeric value corresponding to the transmitted motor configuration data.

In some embodiments, the second ratio matches the predefined numeric value corresponding to the transmitted motor configuration data if the ratio is within a predefined range of the predefined numeric value corresponding to the transmitted motor configuration data In accordance with various embodiments of the present disclosure, a computer-implemented method is provided. In some embodiments, the computer-implemented method comprises transmitting a signal to a motor of a motor driven roller (MDR) to instruct the motor to rotate at a predetermined rotational speed; receiving a signal indicating an actual rotational speed of the motor; receiving a signal indicating an actual rotational speed of a roller of the MDR being rotated by the motor; dividing the actual rotational speed of the motor by the actual rotational speed of the roller to obtain a ratio of motor speed to roller speed; comparing the ratio to each of a plurality of predefined numeric values to determine if the ratio matches any of the predefined numeric values, each of the predefined numeric values being associated with predefined motor configuration data; and transmitting, to the MDR, the predefined motor configuration data corresponding to the one of the predefined numeric values matching the ratio.

In accordance with various embodiments of the present disclosure, a computer program product is provided. In some embodiments, the computer program product comprises at least one non-transitory computer-readable storage medium having computer-readable program code portions stored therein. In some embodiments, the computer-readable program code portions comprise an executable portion configured to transmit a signal to a motor of a motor driven roller (MDR) to instruct the motor to rotate at a predetermined rotational speed; receive a signal indicating an actual rotational speed of the motor; receive a signal indicating an actual rotational speed of a roller of the MDR being rotated by the motor; divide the actual rotational speed of the motor by the actual rotational speed of the roller to obtain a ratio of motor speed to roller speed; compare the ratio to each of a plurality of predefined numeric values to determine if the ratio matches any of the predefined numeric values, each of the predefined numeric values being associated with predefined motor configuration data; and transmit, to the MDR, the predefined motor configuration data corresponding to the one of the predefined numeric values matching the ratio.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
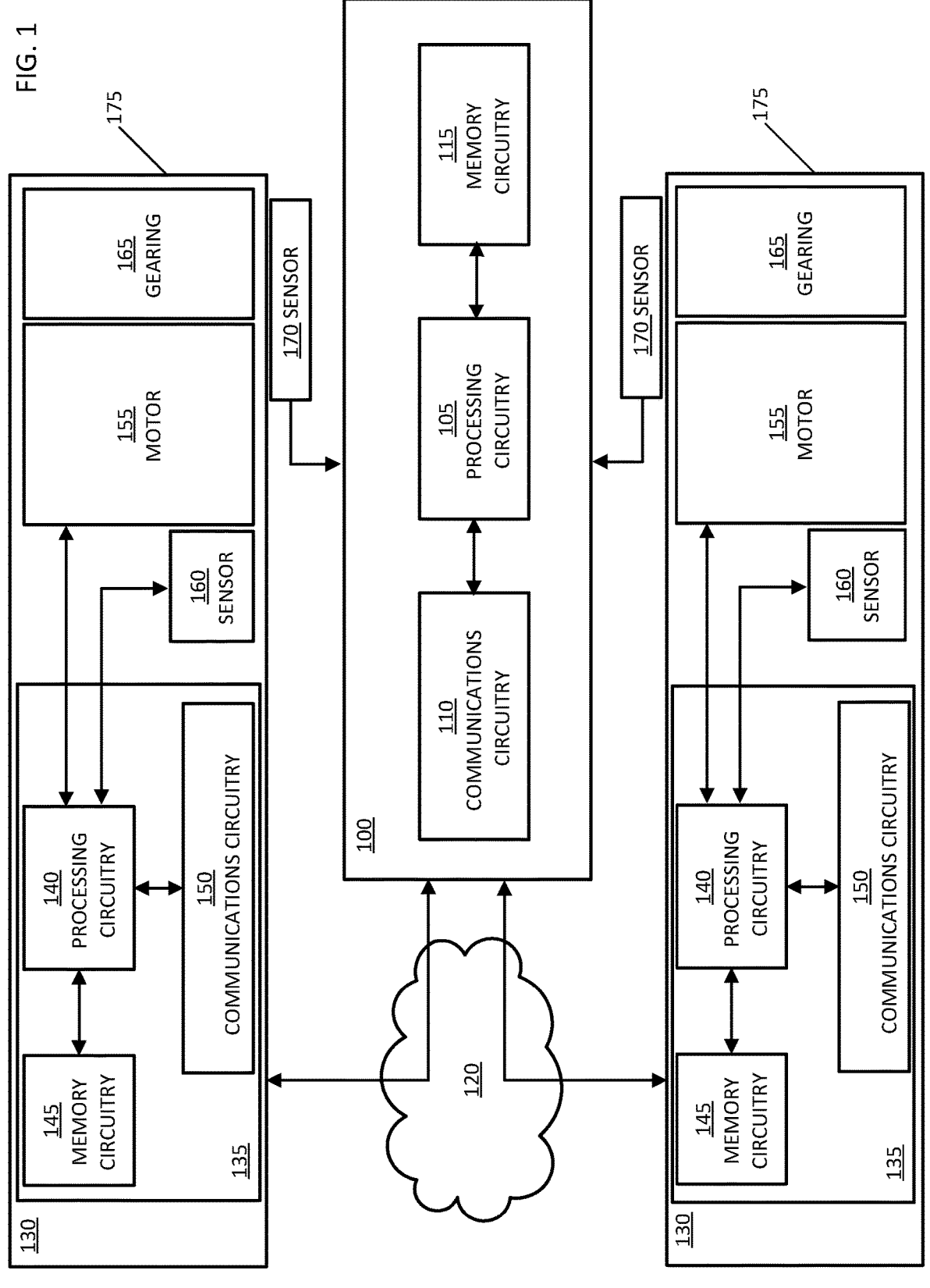
FIG. 1 illustrates an example block diagram of an example system for automatic configuration of a motor driven roller in accordance with example embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

As described above, MDRs are typically available in many different models for different applications. In one example MDR, there are six different models available: (1) standard torque, standard speed (STSS), (2) standard torque, standard speed, with brake (STSS(B)), (3), high torque, standard speed (HTSS), (4) high torque, standard speed, with brake (HTSS(B)), (5) high torque, high speed (HTHS), and (6) high torque, high speed, with brake (HTHS(B)). Each of these different models may need to be configured differently, which, in one example, involves saving (often termed "flashing") a specific configuration file (often a .hex file) to the control board of each type of MDR. In some examples, it is possible to flash the configuration file during the manufacturing process. However, it can be difficult to ensure that the correct configuration file is saved to each MDR, especially in a high volume manufacturing process. It is important that the correct configuration file be flashed to each MDR, and so this must be ensured during the installation of a conveyor system.

Various embodiments of the present disclosure provide automatic configuration of motor driven rollers by automatically determining the type of roller and therefore the appropriate configuration file and automatically flashing the appropriate configuration file to the MDR. In one example embodiment, each of the different MDR types or models that require a different configuration file has a different gearing ratio between the motor and the roller. Thus, in such an example, the type of roller (and therefore the appropriate configuration file) can be determined by comparing the rotational speed of the motor to the rotational speed of the roller to determine the gearing ratio and thereby determine the type or model of MDR and the appropriate configuration file.

Referring now to the figures, FIG. 1 is an example block diagram of an example system for automatic configuration of a motor driven roller in accordance with example embodiments of the present disclosure. FIG. 1 illustrates an example MDR configuration apparatus 100 that can automatically configure two (in the illustrated example) MDRs 130. In other example embodiments, an example MDR configuration apparatus may be able to automatically configure only one MDR or may be able to automatically configure more than two MDRs. In the illustrated embodiment, the MDR configuration apparatus 100 comprises processing circuitry 135, memory circuitry 140, and communications circuitry 145.

The MDR configuration apparatus 100 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries.

The use of the term "circuitry" as used herein with respect to components of the apparatus should therefore be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the MDR configuration apparatus 100 may provide or supplement the functionality of particular circuitry. For example, the processing circuitry 105 may provide processing functionality, the communications circuitry 110 may provide network interface functionality, the memory circuitry 115 may provide storage functionality, and the like.

In some embodiments, the processing circuitry 105 (and/or co-processor or any other processing circuitry assisting or otherwise associated with the processor) may be in communication with the memory circuitry 115 via a bus for passing information among components of the apparatus. The processing circuitry 105 may be embodied in a number of different ways and may, for example, include one or more processing devices configured to perform independently. Additionally, or alternatively, the processing circuitry 105 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

For example, the processing circuitry 105 may be embodied as one or more complex programmable logic devices (CPLDs), microprocessors, multi-core processors, co-processing entities, application-specific instruction-set processors (ASIPs), and/or controllers. Further, the processing circuitry 105 may be embodied as one or more other processing devices or circuitry. The term circuitry may refer to an entirely hardware embodiment or a combination of hardware and computer program products. Thus, the processing circuitry 105 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing circuitry 105 may be configured for a particular use or configured to execute instructions stored in volatile or non-volatile media or otherwise accessible to the processing circuitry 105. As such, whether configured by hardware or computer program products, or by a combination thereof, the processing circuitry 105 may be capable of performing steps or operations according to embodiments of the present disclosure when configured accordingly.

In an example embodiment, the processing circuitry 105 may be configured to execute instructions stored in the memory circuitry 115 or otherwise accessible to the processor. Alternatively, or additionally, the processing circuitry 105 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processing circuitry 105 is embodied as an executor of software instructions, the instructions may specifically configure the processor to perform the algorithms and/or operations described herein when the instructions are executed.

In one embodiment, the memory circuitry 115 may further include or be in communication with volatile media (also referred to as volatile storage, memory, memory storage, memory circuitry and/or similar terms used herein interchangeably). In one embodiment, the volatile storage or memory may also include, such as but not limited to, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the memory circuitry 115 may be used to store at least portions of the databases, database instances, database management system entities, data, applications, programs, program modules, scripts, source code, object code, byte code, compiled code, interpreted code, machine code, executable instructions, and/or the like being executed by, for example, the processing circuitry 105 as shown in FIG. 1. Thus, the databases, database instances, database management system entities, data, applications, programs, program modules, scripts, source code, object code, byte code, compiled code, interpreted code, machine code, executable instructions, and/or the like may be used to control certain aspects of the operation of the MDR configuration apparatus 100 with the assistance of the processing circuitry 105 and operating system.

In one embodiment, the memory circuitry 115 may further include or be in communication with non-volatile media (also referred to as non-volatile storage, memory, memory storage, memory circuitry and/or similar terms used herein interchangeably). In one embodiment, the memory circuitry 115 may include, such as, but not limited to, hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the memory circuitry 115 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to may refer to a structured or unstructured collection of information/data that is stored in a computer-readable storage medium.

In various embodiments of the present disclosure, the memory circuitry 115 may also be embodied as a data storage device or devices, as a separate database server or servers, or as a combination of data storage devices and separate database servers. Further, in some embodiments, memory circuitry 115 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery system may be stored. Further, the information/data required for the operation of the recovery system may also be partially stored in the cloud data storage system and partially stored in a locally maintained data storage system. More specifically, memory circuitry 115 may encompass one or more data stores configured to store information/data usable in certain embodiments.

In the example as shown in FIG. 1, one or more instances of circuitry may be part of the memory circuitry 115. In this example, the term "circuitry" refers to one or more data storage units in the memory circuitry 115 that may store executable computer program instructions. When the executable computer program instructions stored in such circuitry are executed by a processing circuitry (such as, but not limited to, the processing circuitry 105 shown in FIG. 1), the executable computer program instructions may cause the processing circuitry to perform one or more functions.

The communications circuitry 110 may be any means such as a device or circuitry embodied in either hardware or a combination of hardware and software that is configured to receive and/or transmit data from/to a network and/or any other device, circuitry, or module in communication with the MDR configuration apparatus 100. In this regard, the communications circuitry 110 may include, for example, a network interface for enabling communications with a wired or wireless communication network and/or in accordance with a variety of networking protocols described herein. For example, the communications circuitry 110 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

It is also noted that all or some of the information discussed herein can be based on data that is received, generated and/or maintained by one or more components of the MDR configuration apparatus 100. In some embodiments, one or more external systems (such as a remote cloud computing and/or data storage system) may also be leveraged to provide at least some of the functionality discussed herein.

FIG. 1 depicts an MDR configuration apparatus 100 in communication with two MDRs 130. In some embodiments, the MDR configuration apparatus 100 is configured to communicate with each of the depicted MDRs directly or indirectly through direct communication with another device (e.g., a controller). In other embodiments, for example as depicted, the MDR configuration apparatus 100 is configured to communicate with one or more MDRs 130 over a communications network 120.

The communications network 120 may embody any of a myriad of network(s) configured to enable communication between two or more computing device(s). In some embodiments, the communications network 120 embodies a private network. For example, the MDR configuration apparatus 100 may be embodied by various computing device(s) on an internal network, such as one or more server(s) of a warehouse in communication with the various MDRs associated with operating the conveyor system of the warehouse.

In other embodiments, the communications network 120 embodies a public network, for example the Internet. In some such embodiments, the MDR configuration apparatus 100 may embody a remote or "cloud" system that accesses the MDRs 130 over the communications network 120 from a location separate from the physical location of the MDRs 130. For example, the MDR configuration apparatus 100 may be embodied by computing device(s) of a central headquarters, server farm, distributed platform, and/or the like. In some such embodiments, the MDR configuration apparatus 100 may be accessed directly (e.g., via a display and/or peripherals operatively engaged with the MDR configuration apparatus 100), and/or may be accessed indirectly through use of a client device. For example, in some embodiments, a user may login (e.g., utilizing a username and password) or otherwise access the MDR configuration apparatus 100 to access the described functionality with respect to one or more particular warehouses, conveyor lines, and/or the like.

In one example embodiment, the MDR configuration apparatus 100 communicates with the MDRs via a controller area network ("CAN").

In the illustrated example, each MDR 130 comprises an MDR control board 135, a motor 155, gearing 165, and a motor speed sensor 160, all within a cylindrical housing 175 (at least a portion of which is selectively rotatable by the motor 150 and gearing 160). In the illustrated example, the MDR control board 135 comprises processing circuitry 140, memory circuitry 145, and communications circuitry 150. A roller speed sensor 170 is external to the housing 175 but could be internal to the housing in some example embodiments. The motor 155 is typically a 24 volt DC brushless motor, but any suitable motor type may be used. The gearing 160 is coupled to the shaft of the motor 155 and to the rotatable portion of the cylindrical housing 175 to translate the rotation of the motor shaft into rotation of the rotatable portion of the cylindrical housing 175. Any suitable type and ratio of gearing may be used, depending, for example, on the motor type and the specific application of the MDR.

In an example embodiment, the processing circuitry 140 controls the operation of the motor 155 (e.g., start, stop, speed, etc.), typically according to configuration data and instructional programming stored in the memory circuitry 145. The processing circuitry 140 can detect and confirm the rotational speed of the motor 155 via the sensor 160, which in an example embodiment is a Hall sensor but may be any suitable type of sensor. The communications circuitry 150 enables the MDRs to communicate with the MDR configuration apparatus 100 and other devices, such as via the network 120 which may be a controller area network ("CAN").

Figure 2A:
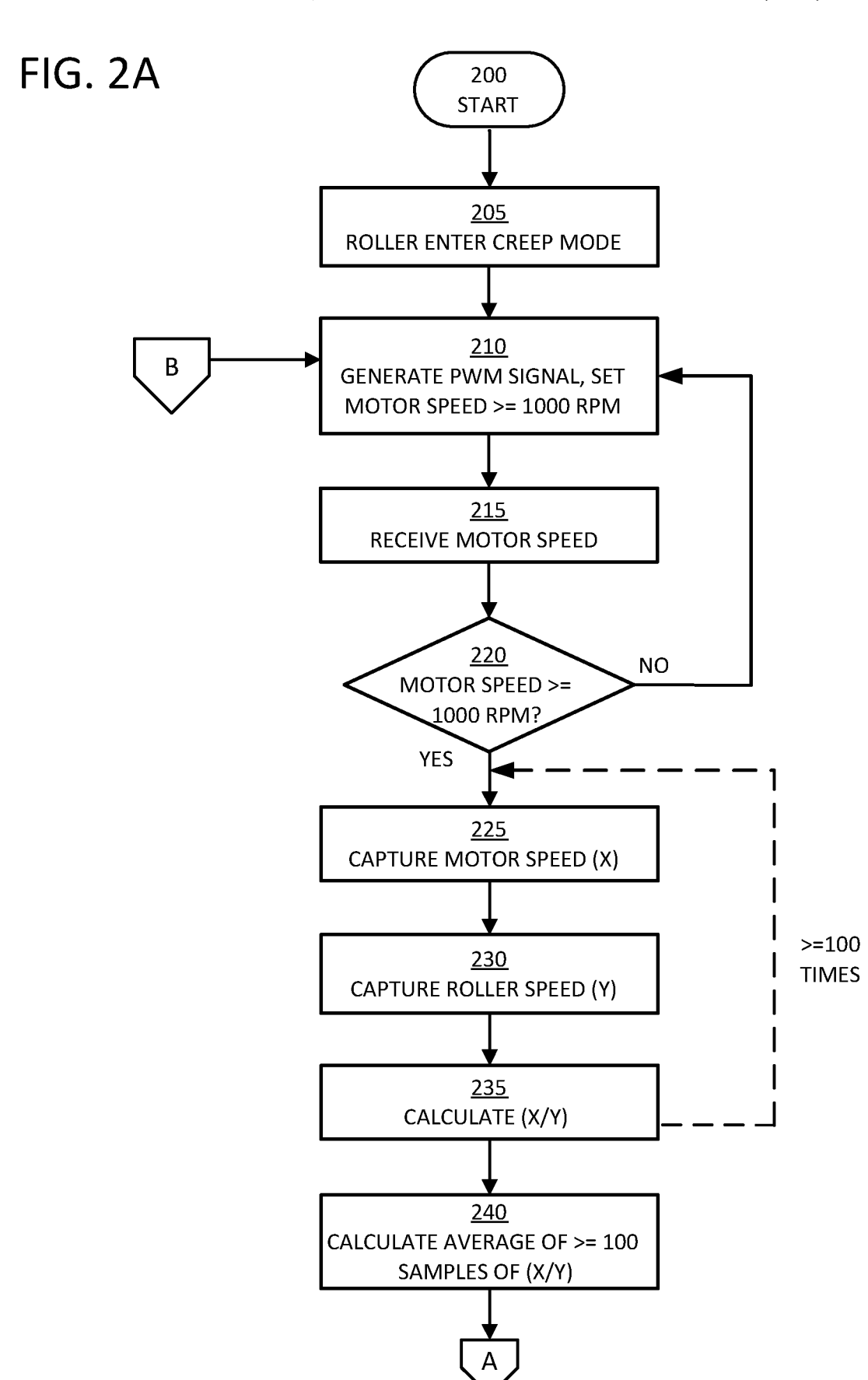
FIGS. 2A and 2B are an example flowchart illustrating an example method of automatic configuration of a motor driven roller in accordance with example embodiments of the present disclosure.
Figure 2B:
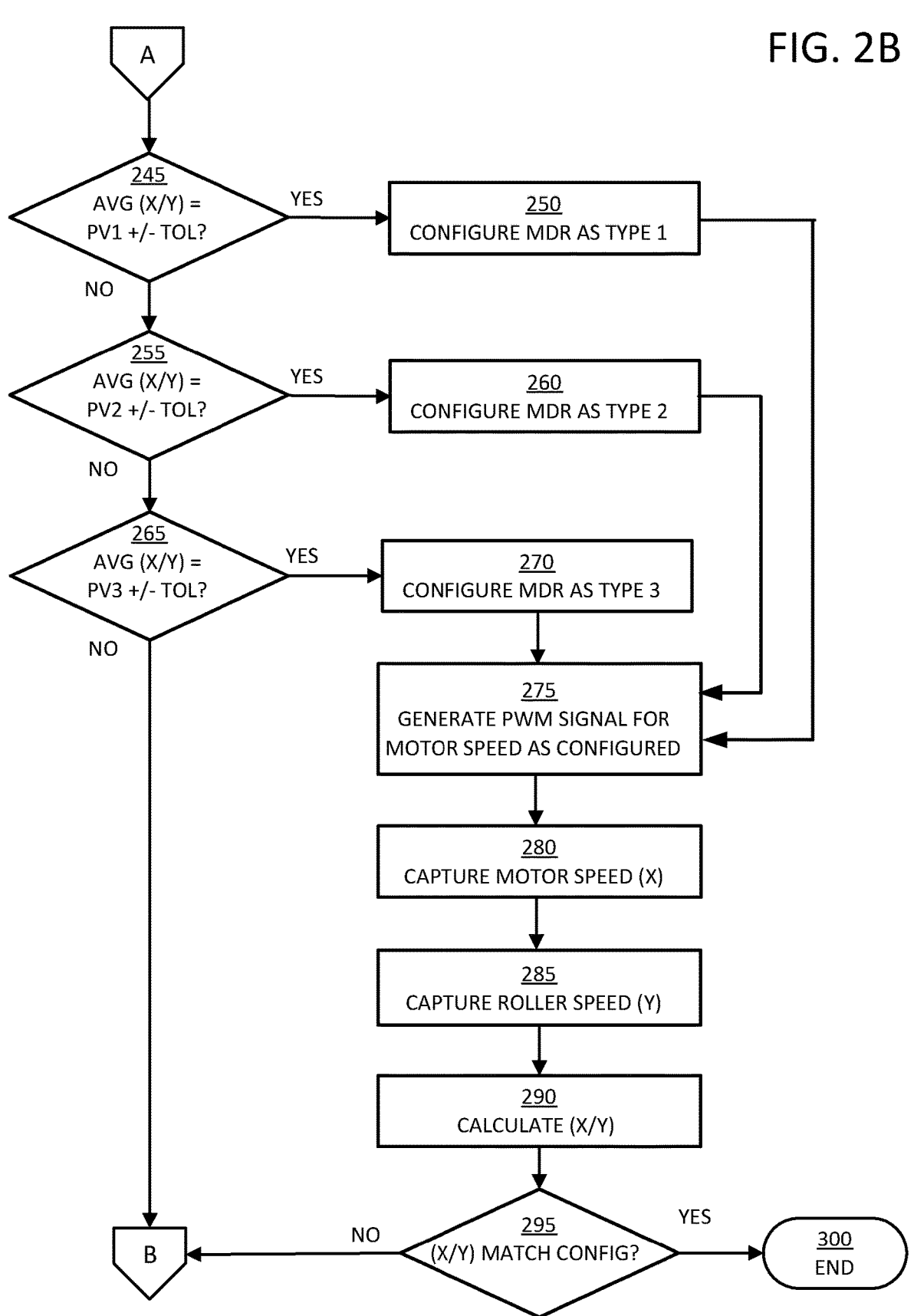

Reference will now be made to FIGS. 2A and 2B, which provide flowcharts illustrating example steps, processes, procedures, and/or operations in accordance with various embodiments of the present disclosure.

Various methods described herein, including, for example, example methods as shown in FIGS. 2A and 2B, may provide various technical benefits and improvements. It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIGS. 2A and 2B may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIGS. 2A and 2B, an example method is illustrated. In some embodiments, the example method provides automatic configuration of motor driven rollers by automatically determining the type of roller and therefore the appropriate configuration file and automatically flashing the appropriate configuration file to the MDR. The example method may be used to automatically configure any number of MDRs which are in communication with an MDR configuration apparatus, such as the two MDRs 130 in communication with the MDR configuration apparatus 100 of FIG. 1. Even if an MDR configuration apparatus is in communication with and able to automatically configure more than one MDR, the automatic configuration of each MDR would likely be performed one at a time.

The example method of FIGS. 2A and 2B starts at step/operation 200. At step/operation 205, a processor (such as, but not limited to, the processing circuitry 105 of the MDR configuration apparatus 100 described above in connection with FIG. 1) sends an instruction to an MDR (such as the MDR 130 described above in connection with FIG. 1) for the MDR to enter creep mode.

In the example shown in FIGS. 2A and 2B, at step/operation 210, a processor (such as, but not limited to, the processing circuitry 105 of the MDR configuration apparatus 100 described above in connection with FIG. 1) sends a signal to the MDR (such as MDR 130 described above in connection with FIG. 1) for the MDR motor (such as motor 155 described above in connection with FIG. 1) to rotate at a predetermined rotational speed (the predetermined rotational speed may vary based on the motor type). The signal is typically a pulse width modulation (PWM) signal, although the signal type may vary depending on the motor type. In one example embodiment, the predetermined rotational speed is equal to or greater than 1000 revolutions per minute (RPM).

In the example shown in FIGS. 2A and 2B, at step/operation 215, a processor (such as, but not limited to, the processing circuitry 105 of the MDR configuration apparatus 100 described above in connection with FIG. 1) receives the rotational speed of the MDR motor (such as motor 155 described above in connection with FIG. 1). The rotational speed of the motor is sensed by a sensor within the MDR (such as the sensor 160 described above in connection with FIG. 1) and communicated (such as via network 120 described above in FIG. 1) from the MDR to the processor.

In the example shown in FIGS. 2A and 2B, at step/operation 220, a processor (such as, but not limited to, the processing circuitry 105 of the MDR configuration apparatus 100 described above in connection with FIG. 1) determines if the detected rotational speed of the MDR motor is equal to or exceeds the predetermined rotational speed at which the motor was instructed to rotate. If it is determined at step/operation 220 that the detected rotational speed of the MDR motor is less than the predetermined rotational speed at which the motor was instructed to rotate, steps/operations 210, 215, and 220 are repeated as necessary until it is determined at step/operation 220 that the detected rotational speed of the MDR motor is equal to or greater than the predetermined rotational speed at which the motor was instructed to rotate.

In the example shown in FIGS. 2A and 2B, if it is determined at step/operation 220 that the detected rotational speed of the MDR motor is equal to or greater than the predetermined rotational speed at which the motor was instructed to rotate, at step/operation 225, a processor (such as, but not limited to, the processing circuitry 105 of the MDR configuration apparatus 100 described above in connection with FIG. 1) captures the rotational speed (designated as 'X' in FIGS. 2A and 2B) of the motor.

In the example shown in FIGS. 2A and 2B, at step/operation 230, a processor (such as, but not limited to, the processing circuitry 105 of the MDR configuration apparatus 100 described above in connection with FIG. 1) captures the rotational speed of the MDR (specifically, the rotational speed (designated as 'Y' in FIGS. 2A and 2B) of the rotatable portion of the MDR's housing (such as the housing 175 described above in connection with FIG. 1)). In the example shown in FIG. 1, the rotational speed of the rotatable portion of the housing 175 is detected by the roller speed sensor 170 and transmitted to the MDR configuration apparatus 100. The roller speed sensor 170 may comprise any suitable sensor, including but not limited to an infrared sensor.

In the example shown in FIGS. 2A and 2B, at step/operation 235, a processor (such as, but not limited to, the processing circuitry 105 of the MDR configuration apparatus 100 described above in connection with FIG. 1) calculates the ratio of motor speed to roller speed by dividing the motor speed by the roller speed ("X/Y").

In the example shown in FIGS. 2A and 2B, steps/operations 225, 230, and 235 are repeated (at least 100 times in the illustrated embodiment) over a short time period (in one example, over a few milliseconds) to obtain a larger data set of motor speeds, rollers speeds, and ratios which will reduce the effect of variations in the motor speed. At step/operation 240, the calculated ratios are averaged.

In the example shown in FIGS. 2A and 2B, at steps/operations 245, 255, and 265, a processor (such as, but not limited to, the processing circuitry 105 of the MDR configuration apparatus 100 described above in connection with FIG. 1) compares the average ratio of motor speed to roller speed to each of three different predefined target values ("PV1", "PV2", "PV3"), plus or minus a predefined tolerance ("TOL"). The predefined target values each correspond to the different gearing ratio between the motor and the roller for each of the different MDR types or models that require a different configuration file. Thus, while the example shown in FIGS. 2A and 2B uses three different predefined target values, other embodiments may have fewer or more than three different predefined target values depending on the number of different types or models of MDR requiring a different configuration file. In the example shown, predefined target value PV1 corresponds to an MDR type or model termed "TYPE 1" herein; predefined target value PV2 corresponds to an MDR type or model termed "TYPE 2" herein; predefined target value PV3 corresponds to an MDR type or model termed "TYPE 3" herein.

Because of structural/mechanical variations in the motor, gearing, and roller, the ratio of motor speed to roller speed may vary somewhat from the expected value. Thus, in an example embodiment, the average ratio of motor speed to roller speed is considered to match one of the predefined target values if the average ratio of motor speed to roller speed is within a predefined range or tolerance of one of the predefined target values. In an example embodiment, the predefined range is plus or minus (+/−) ten percent of each respective predefined target value. The predefined range or tolerance may vary based on, for example, the sensor type and sensor accuracy.

More specifically, in the example shown in FIGS. 2A and 2B, at step/operation 245, a processor (such as, but not limited to, the processing circuitry 105 of the MDR configuration apparatus 100 described above in connection with FIG. 1) compares the average ratio of motor speed to roller speed to a first predefined target value (PV1), plus or minus a predefined tolerance. If it is determined at step/operation 245 that the average ratio of motor speed to roller speed equals the first predefined target value (PV1), plus or minus a predefined tolerance, then, at step/operation 250, a processor (such as, but not limited to, the processing circuitry 105 of the MDR configuration apparatus 100 described above in connection with FIG. 1) configures the MDR by transmitting configuration data (in one example, as a .hex file) corresponding to the average ratio (and therefor to MDR TYPE 1) to the MDR.

In the example shown in FIGS. 2A and 2B, if at step/operation 245 it is determined that the average ratio of motor speed to roller speed does not equal the first predefined target value (PV1) (plus or minus a predefined tolerance), then, at step/operation 255, a processor (such as, but not limited to, the processing circuitry 105 of the MDR configuration apparatus 100 described above in connection with FIG. 1) compares the average ratio of motor speed to roller speed to a second predefined target value (PV2), plus or minus a predefined tolerance. If it is determined at step/operation 255 that the average ratio of motor speed to roller speed equals the second predefined target value (PV2), plus or minus a predefined tolerance, then, at step/operation 260, a processor (such as, but not limited to, the processing circuitry 105 of the MDR configuration apparatus 100 described above in connection with FIG. 1) configures the MDR by transmitting configuration data (in one example, as a .hex file) corresponding to the average ratio (and therefor to MDR TYPE 2) to the MDR.

In the example shown in FIGS. 2A and 2B, if at step/operation 255 it is determined that the average ratio of motor speed to roller speed does not equal the second predefined target value (PV2) (plus or minus a predefined tolerance), then, at step/operation 265, a processor (such as, but not limited to, the processing circuitry 105 of the MDR configuration apparatus 100 described above in connection with FIG. 1) compares the average ratio of motor speed to roller speed to a third predefined target value (PV3), plus or minus a predefined tolerance. If it is determined at step/operation 265 that the average ratio of motor speed to roller speed equals the third predefined target value (PV3), plus or minus a predefined tolerance, then, at step/operation 270, a processor (such as, but not limited to, the processing circuitry 105 of the MDR configuration apparatus 100 described above in connection with FIG. 1) configures the MDR by transmitting configuration data (in one example, as a .hex file) corresponding to the average ratio (and therefor to MDR TYPE 3) to the MDR.

In the example shown in FIGS. 2A and 2B, if at step/operation 265 it is determined that the average ratio of motor speed to roller speed does not equal the third predefined target value (PV3) (plus or minus a predefined tolerance) (that is, the average ratio of motor speed to roller speed does not equal any of the predefined target values), then the process returns to step/operation 210 to start the process again. Although not illustrated, in some embodiments, the process illustrated in FIGS. 2A and 2B may be configured to repeat a predefined number of times (e.g., three time) if needed to try to match the average ratio of motor speed to roller speed to one of the predefined target values. In one example, if no match is found against any predefined value, the process may be stopped and an error message may be generated.

In the example shown in FIGS. 2A and 2B, at steps/operations 275-295, a processor (such as, but not limited to, the processing circuitry 105 of the MDR configuration apparatus 100 described above in connection with FIG. 1) verifies that the correct configuration data has been sent to the MDR by: at step/operation 275, sending a signal (typically, but not necessarily, a PWM signal) to the MDR (such as MDR 130 described above in connection with FIG. 1) for the MDR motor (such as motor 155 described above in connection with FIG. 1) to rotate at a rotational speed within the MDR's rated speed range; at step/operation 280, capturing the motor speed (X); at step/operation 285, capturing the roller speed (Y); at step/operation 290, calculating the ratio of motor speed (X) to roller speed (Y) by dividing the motor speed by the roller speed ("X/Y"); and at step/ operation 295, comparing the ratio of motor speed to roller speed to the predefined target value corresponding to the selected MDR configuration.

As with steps/operations 225-240 described above, in some example embodiments steps/operations 275-290 may be repeated to obtain an average ratio of motor speed to roller speed to compare to the predefined target value corresponding to the selected MDR configuration.

In the example shown in FIGS. 2A and 2B, if at step/operation 295 it is determined that the ratio of motor speed to roller speed does not equal the predefined target value corresponding to the selected MDR configuration (plus or minus a predefined tolerance), then the process returns to step/operation 210 to start the process again.

In the example shown in FIGS. 2A and 2B, if at step/operation 295 it is determined that the ratio of motor speed to roller speed does equal the predefined target value corresponding to the selected MDR configuration (plus or minus a predefined tolerance), then the process ends at step/operation 300.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus comprising at least one processor and at least one non-transitory memory comprising program code, wherein the at least one non-transitory memory and the program code are configured to, with the at least one processor, cause the apparatus to at least:

transmit a signal to a motor of a motor driven roller (MDR) to instruct the motor to rotate at a predetermined rotational speed;

receive a signal indicating an actual rotational speed of the motor;

receive a signal indicating an actual rotational speed of a roller of the MDR being rotated by the motor;

divide the actual rotational speed of the motor by the actual rotational speed of the roller to obtain a ratio of motor speed to roller speed;

compare the ratio to each of a plurality of predefined numeric values to determine if the ratio matches any of the predefined numeric values, each of the predefined numeric values being associated with predefined motor configuration data; and transmit, to the MDR, the predefined motor configuration data corresponding to the one of the predefined numeric values matching the ratio.

2. The apparatus of claim 1, wherein the ratio matches a predefined numeric value if the ratio is within a predefined range of the predefined numeric value.

3. The apparatus of claim 1, wherein receiving a signal indicating an actual rotational speed of the motor, receiving a signal indicating an actual rotational speed of a roller of the MDR being rotated by the motor, and dividing the actual rotational speed of the motor by the actual rotational speed of the roller to obtain a ratio of motor speed to roller speed are performed a plurality of times to obtain a plurality of ratios;

wherein the at least one non-transitory memory and the program code are configured to, with the at least one processor, cause the apparatus to calculate an average of the plurality of ratios; and wherein comparing the ratio to each of a plurality of predefined numeric values to determine if the ratio matches any of the predefined numeric values comprises comparing the average of the ratios to each of a plurality of predefined numeric values to determine if the average of the ratios matches any of the predefined numeric values.

4. The apparatus of claim 1, wherein the at least one non-transitory memory and the program code are configured to, with the at least one processor, cause the apparatus to determine if the actual rotational speed of the motor equals or exceeds the predetermined rotational speed; and wherein dividing the actual rotational speed of the motor by the actual rotational speed of the roller to obtain a ratio of motor speed to roller speed comprises dividing the actual rotational speed of the motor by the actual rotational speed of the roller to obtain a ratio of motor speed to roller speed if the actual rotational speed of the motor equals or exceeds the predetermined rotational speed.

5. The apparatus of claim 4, wherein the predetermined rotational speed equals 1000 revolutions per minute.

6. The apparatus of claim 1, wherein, after transmitting, to the MDR, the predefined motor configuration data corresponding to the one of the predefined numeric values matching the ratio, the at least one non-transitory memory and the program code are configured to, with the at least one processor, cause the apparatus to:

transmit a signal to the motor of the MDR to instruct the motor to rotate at a second predetermined rotational speed corresponding to the transmitted motor configuration data;

receive a signal indicating an actual rotational speed of the motor;

receive a signal indicating an actual rotational speed of a roller of the MDR being rotated by the motor;

divide the actual rotational speed of the motor by the actual rotational speed of the roller to obtain a second ratio of motor speed to roller speed; and compare the second ratio to the predefined numeric value corresponding to the transmitted motor configuration data to determine if the second ratio matches the predefined numeric value corresponding to the transmitted motor configuration data.

7. The apparatus of claim 6, wherein the second ratio matches the predefined numeric value corresponding to the transmitted motor configuration data if the ratio is within a predefined range of the predefined numeric value corresponding to the transmitted motor configuration data.

8. A computer-implemented method comprising:

transmitting a signal to a motor of a motor driven roller (MDR) to instruct the motor to rotate at a predetermined rotational speed;

receiving a signal indicating an actual rotational speed of the motor;

receiving a signal indicating an actual rotational speed of a roller of the MDR being rotated by the motor;

dividing the actual rotational speed of the motor by the actual rotational speed of the roller to obtain a ratio of motor speed to roller speed;

comparing the ratio to each of a plurality of predefined numeric values to determine if the ratio matches any of the predefined numeric values, each of the predefined numeric values being associated with predefined motor configuration data; and transmitting, to the MDR, the predefined motor configuration data corresponding to the one of the predefined numeric values matching the ratio.

9. The computer-implemented method of claim 8, wherein the ratio matches a predefined numeric value if the ratio is within a predefined range of the predefined numeric value.

10. The computer-implemented method of claim 8, wherein receiving a signal indicating an actual rotational speed of the motor, receiving a signal indicating an actual rotational speed of a roller of the MDR being rotated by the motor, and dividing the actual rotational speed of the motor by the actual rotational speed of the roller to obtain a ratio of motor speed to roller speed are performed a plurality of times to obtain a plurality of ratios;

wherein the computer-implemented method further comprises calculating an average of the plurality of ratios; and wherein comparing the ratio to each of a plurality of predefined numeric values to determine if the ratio matches any of the predefined numeric values comprises comparing the average of the ratios to each of a plurality of predefined numeric values to determine if the average of the ratios matches any of the predefined numeric values.

11. The computer-implemented method of claim 8, further comprising determining if the actual rotational speed of the motor equals or exceeds the predetermined rotational speed;

wherein dividing the actual rotational speed of the motor by the actual rotational speed of the roller to obtain a ratio of motor speed to roller speed comprises dividing the actual rotational speed of the motor by the actual rotational speed of the roller to obtain a ratio of motor speed to roller speed if the actual rotational speed of the motor equals or exceeds the predetermined rotational speed.

12. The computer-implemented method of claim 11, wherein the predetermined rotational speed equals 1000 revolutions per minute.

13. The computer-implemented method of claim 8, further comprising:

transmitting a signal to the motor of the MDR to instruct the motor to rotate at a second predetermined rotational speed corresponding to the transmitted motor configuration data;

receiving a signal indicating an actual rotational speed of the motor;

receiving a signal indicating an actual rotational speed of a roller of the MDR being rotated by the motor;

dividing the actual rotational speed of the motor by the actual rotational speed of the roller to obtain a second ratio of motor speed to roller speed; and comparing the second ratio to the predefined numeric value corresponding to the transmitted motor configuration data to determine if the second ratio matches the predefined numeric value corresponding to the transmitted motor configuration data.

14. The computer-implemented method of claim 13, wherein the second ratio matches the predefined numeric value corresponding to the transmitted motor configuration data if the ratio is within a predefined range of the predefined numeric value corresponding to the transmitted motor configuration data.

15. A computer program product comprising at least one non-transitory computer-readable storage medium having computer-readable program code portions stored therein, the computer-readable program code portions comprising an executable portion configured to:

transmit a signal to a motor of a motor driven roller (MDR) to instruct the motor to rotate at a predetermined rotational speed;

receive a signal indicating an actual rotational speed of the motor;

receive a signal indicating an actual rotational speed of a roller of the MDR being rotated by the motor;

divide the actual rotational speed of the motor by the actual rotational speed of the roller to obtain a ratio of motor speed to roller speed;

compare the ratio to each of a plurality of predefined numeric values to determine if the ratio matches any of the predefined numeric values, each of the predefined numeric values being associated with predefined motor configuration data; and transmit, to the MDR, the predefined motor configuration data corresponding to the one of the predefined numeric values matching the ratio.

16. The computer program product of claim 15, wherein the ratio matches a predefined numeric value if the ratio is within a predefined range of the predefined numeric value.

17. The computer program product of claim 15, wherein receiving a signal indicating an actual rotational speed of the motor, receiving a signal indicating an actual rotational speed of a roller of the MDR being rotated by the motor, and dividing the actual rotational speed of the motor by the actual rotational speed of the roller to obtain a ratio of motor speed to roller speed are performed a plurality of times to obtain a plurality of ratios;

wherein the computer-readable program code portions comprise the executable portion configured to calculate an average of the plurality of ratios; and wherein comparing the ratio to each of a plurality of predefined numeric values to determine if the ratio matches any of the predefined numeric values comprises comparing the average of the ratios to each of a plurality of predefined numeric values to determine if the average of the ratios matches any of the predefined numeric values.

18. The computer program product of claim 15, wherein the computer-readable program code portions comprise the executable portion configured to determine if the actual rotational speed of the motor equals or exceeds the predetermined rotational speed; and wherein dividing the actual rotational speed of the motor by the actual rotational speed of the roller to obtain a ratio of motor speed to roller speed comprises dividing the actual rotational speed of the motor by the actual rotational speed of the roller to obtain a ratio of motor speed to roller speed if the actual rotational speed of the motor equals or exceeds the predetermined rotational speed.

19. The computer program product of claim 15, wherein, after transmitting, to the MDR, the predefined motor configuration data corresponding to the one of the predefined numeric values matching the ratio, the computer-readable program code portions comprise the executable portion configured to:

transmit a signal to the motor of the MDR to instruct the motor to rotate at a second predetermined rotational speed corresponding to the transmitted motor configuration data;

receive a signal indicating an actual rotational speed of the motor;

receive a signal indicating an actual rotational speed of a roller of the MDR being rotated by the motor;

divide the actual rotational speed of the motor by the actual rotational speed of the roller to obtain a second ratio of motor speed to roller speed; and compare the second ratio to the predefined numeric value corresponding to the transmitted motor configuration data to determine if the second ratio matches the predefined numeric value corresponding to the transmitted motor configuration data.

20. The computer program product of claim 19, wherein the second ratio matches the predefined numeric value corresponding to the transmitted motor configuration data if the ratio is within a predefined range of the predefined numeric value corresponding to the transmitted motor configuration data.

\* \* \* \* \*